United States Patent
Scholl et al.

(10) Patent No.: US 10,093,279 B2
(45) Date of Patent: Oct. 9, 2018

(54) WIPER BLADE FOR CLEANING VEHICLE WINDSCREENS

(71) Applicant: Valeo Systèmes d'Essuyage, Le Mesnil Saint Denis (FR)

(72) Inventors: Wolfgang Scholl, Gemmrigheim (DE); Michael Buss, Illingen (DE); Jürgen Bommer, Tamm (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 62 days.

(21) Appl. No.: 13/952,123

(22) Filed: Jul. 26, 2013

(65) Prior Publication Data

US 2014/0026346 A1    Jan. 30, 2014

(30) Foreign Application Priority Data

Jul. 27, 2012 (DE) .................. 10 2012 106 837

(51) Int. Cl.
*B60S 1/38* (2006.01)
*B60S 1/52* (2006.01)

(52) U.S. Cl.
CPC .......... *B60S 1/3801* (2013.01); *B60S 1/3862* (2013.01); *B60S 1/524* (2013.01); *B60S 1/381* (2013.01); *B60S 1/3879* (2013.01)

(58) Field of Classification Search
CPC ....... B60S 1/3879; B60S 1/3862; B60S 1/524
USPC ............ 15/250.32, 250.44–250.48, 250.361, 15/250.201
See application file for complete search history.

(56) References Cited

U.S. PATENT DOCUMENTS

| | | | | |
|---|---|---|---|---|
| 6,523,218 B1 * | 2/2003 | Kotlarski | ................. | 15/250.201 |
| 6,634,056 B1 * | 10/2003 | De Block | ................. | 15/250.32 |
| 7,464,433 B2 * | 12/2008 | Thomar et al. | ........... | 15/250.201 |
| 7,540,061 B1 * | 6/2009 | Huang | ..................... | 15/250.201 |
| 7,979,950 B2 * | 7/2011 | Boland | ...................... | 15/250.32 |

(Continued)

FOREIGN PATENT DOCUMENTS

| DE | 102006031514 A1 * | 1/2008 | ............... B60S 1/40 |
|---|---|---|---|
| DE | 10 2010 025 687 A1 | 1/2012 | |
| WO | WO 2008043622 A1 * | 4/2008 | ............. B60S 1/381 |

OTHER PUBLICATIONS

DE102006031514 (machine translation), 2008.*
WO2008043622A1 (English translation), 2008.*

*Primary Examiner* — Andrew A Horton
(74) *Attorney, Agent, or Firm* — Osha Liang LLP

(57) ABSTRACT

A wiper blade for cleaning vehicle windscreens includes a wiper rubber with groove-like holding fixtures formed in the longitudinal sides of the wiper rubber, in which spring strips are partially contained. The spring strips project laterally from the holding fixtures with their longitudinal sides, and having an adapter element consisting at least essentially of plastic for the at least indirect attachment of the wiper blade to a wiper arm. The adapter element exhibits groove-like guides which are disposed on the two longitudinal sides of the adapter element on sides facing one another, wherein the guides encompass the two spring strips on the sections of the spring strips projecting from the holding fixtures. The adapter element is connected to at least one separate reinforcing element which encompasses the spring strips on the sections of said spring strips projecting from the holding fixtures at least section-wise.

32 Claims, 2 Drawing Sheets

(56) References Cited

U.S. PATENT DOCUMENTS

Figure 1:
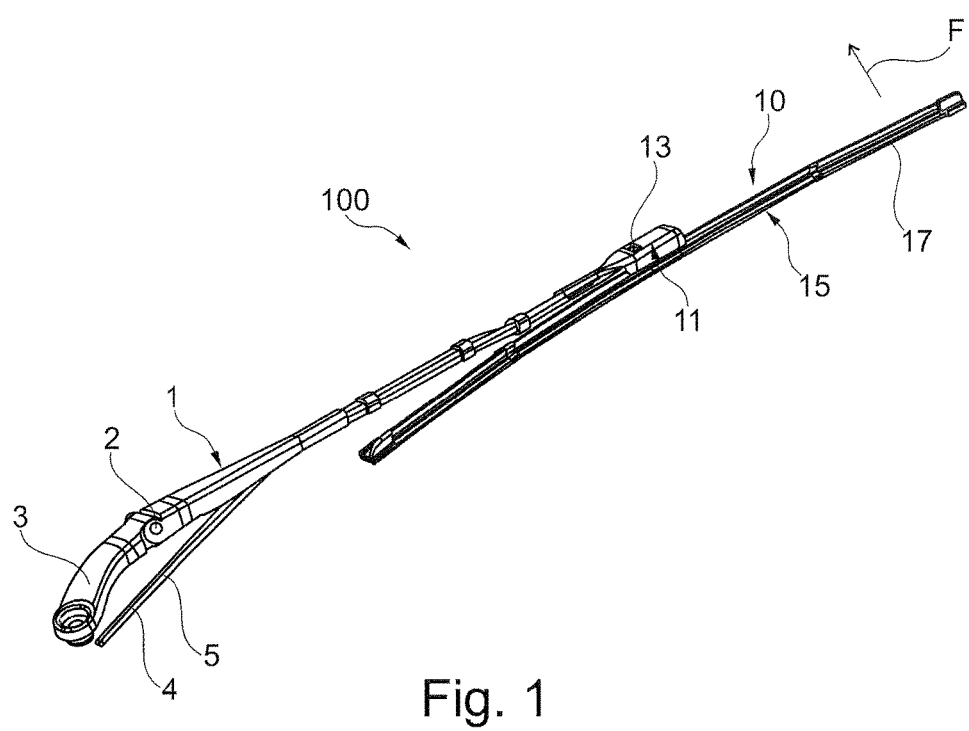

2007/0192983 A1* 8/2007 Chen ...................... 15/250.001
2009/0044365 A1* 2/2009 Koppen et al. ............ 15/250.31
2009/0320230 A1* 12/2009 Boland .................... 15/250.32
2011/0131749 A1* 6/2011 Boland ..................... 15/250.3

* cited by examiner

WIPER BLADE FOR CLEANING VEHICLE WINDSCREENS

PRIOR ART

The invention relates to a wiper blade for cleaning vehicle windscreens according to the precharacterizing clause of claim 1.

A wiper blade of this type is known from the applicant's DE 10 2010 025 687 A1. The known wiper blade has a wiper blade adapter which consists of plastic and which, in the manner of a rider, encompasses a wiper blade body in the region of two pre-curved spring strips arranged in the longitudinal sides of the wiper blade body. The spring strips in this case are partially arranged in holding fixtures, which are U-shaped in cross section, in a wiper rubber, and the spring-strip longitudinal sides which project out of the wiper rubber are contained in groove-like guides of the wiper blade adapter. During the operation of the wiper blade, forces acting perpendicularly to the longitudinal direction of the wiper blade result in stresses at the corner regions of the groove-like guides of the wiper blade adapter. Transverse forces of this type can be caused, in particular, by wind forces which differ in strength over the longitudinal extent of the wiper blade. The stresses mentioned result in a spot-type loading of the plastic of the wiper blade adapter, wherein the stresses which occur have to be below a limit value in order to avoid plastic deformation of the wiper blade adapter. Although it could then be endeavoured to reduce the stresses acting in the corners of the groove-like guide of the wiper blade adapter by increasing the length of the wiper blade adapter in the longitudinal direction of the wiper blade, an increase in the length of the wiper blade adapter is critical in so far as the spring strips cannot deploy any spring action in the region of the groove-like guides. The lack of spring action below the wiper blade adapter may result in a poor wiping pattern below the wiper blade adapter. In other words, this means that, with a longer wiper blade adapter, the wiping quality deteriorates.

DISCLOSURE OF THE INVENTION

Taking the depicted prior art as a starting point, the invention is based on the object of developing a wiper blade for cleaning vehicle windscreens according to the precharacterizing clause of claim 1 in such a manner that a maximum level of transverse forces in the spring strips can be absorbed without damage to or deformation of the wiper blade adapter, wherein, at the same time, a minimum overall length of the wiper blade adapter in the longitudinal direction of the wiper blade is intended to be obtained, so that the spring action of the spring strips is optimized in order to maintain as high a wiping quality as possible. This object is achieved according to the invention in a wiper blade for cleaning vehicle windscreens with the features of claim 1 in that the adapter element is connected to at least one separate reinforcing element which encompasses the spring strips on the sections of said spring strips projecting from the holding fixtures at least section-wise. In other words, this means that the adapter element is provided with a separate reinforcing element which is optimized with regard to the absorption of the transverse forces in the spring strips. By this means, given a certain material for the adapter element or for the wiper blade adapter, the overall length of the wiper blade adapter can be minimized, or, given a predetermined length of the wiper blade adapter, particularly high transverse forces can be absorbed via the adapter element.

Advantageous developments of the wiper blade according to the invention for cleaning vehicle windscreens are mentioned in the dependent claims. The scope of the invention includes all combinations of at least two of the features disclosed in the claims, the description and/or the figures.

In a strength-optimized configuration of the reinforcing element, the latter is disposed in the area of a front end section of the adapter element. This is because the transverse forces acting on the wiper blade or the spring strips primarily act in the region of the front end sections of the adapter element or the greatest stresses prevail there.

It is very particularly preferred if the reinforcing element is made of metal. Metal is appropriate since it permits increased surface pressures in comparison to plastic and the introduction of relatively high stresses without being plastically deformed, while production costs are relatively low.

In a very particularly preferred configuration, it is provided that the reinforcing element is in the form of a deep-drawn part and covers the front edge of the adapter element at least section-wise. By means of the formation as a deep-drawn part, the shape of the reinforcing element can be adapted to the shape of the front edge of the adapter element in particular in a simple manner.

In order to introduce the forces absorbed by the wiper blade via the reinforcing element into the adapter element over as large a surface area as possible and with low stress peaks, the reinforcing element exhibits a preferably circumferential edge section on the side facing the adapter element, said edge section encompassing the adapter element on its front edge facing it in a positive locking manner. By means of the positive lock, a transmission of the forces over a large surface area is therefore obtained.

In order to position the reinforcing element with, and to connect the latter to, the adapter element with as little outlay on manufacturing as possible, it is provided in a further configuration of the invention that the reinforcing element is connected to the adapter element by a locking connection.

In a structurally preferred configuration of the locking connection, it is provided that the locking connection is formed by two locks on opposite sides of the reinforcing element, which engage in recesses in the adapter element.

Figure 3:
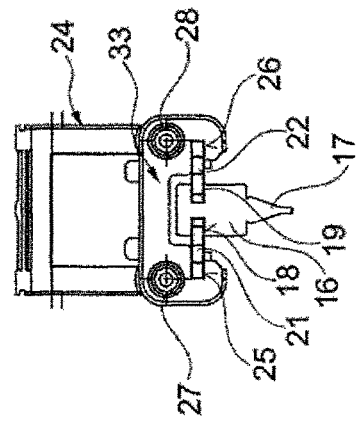
Figure 2:
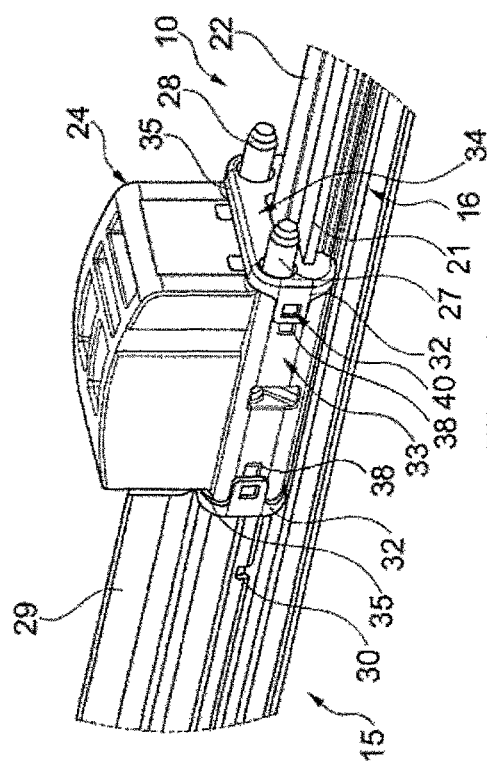
Figure 4:
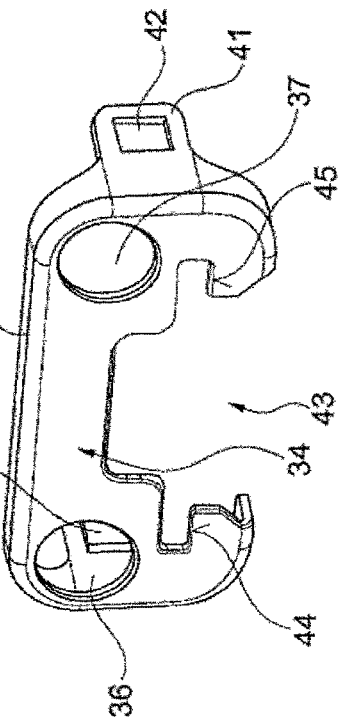

Further features, advantages and details of the invention emerge from the description below of preferred exemplary embodiments and with reference to the drawing, in which:

FIG. 1 a wiper device with a wiper blade according to the invention attached to a wiper arm, in a perspective view, FIG. 2 shows a subregion of the wiper blade with an adapter element on the wiper-blade side and with parts of the wiper blade body, in a perspective view, FIG. 3 shows a section through a wiper blade according to the invention in the region of the adapter element, and FIG. 4 shows a reinforcing element in the form of a deep-drawn part in a perspective individual illustration.

Identical elements or elements having the same function are provided with the same designations in the figures.

FIG. 1 illustrates a wiper device 100 for cleaning a vehicle windscreen (not illustrated). The wiper device 100 comprises a wiper arm 1 which is attached pivotably via a wiper arm joint 2 to a bearing element 3. The bearing element 3, for its part, is connected to a shaft of a wiper drive (not illustrated).

At that end of the wiper arm 1 which faces away from the wiper arm joint 2, a wiper blade 10 according to the invention is fastened interchangeably to the wiper arm 1. For this purpose, the wiper blade 10 has a wiper blade adapter 11 which comprises, for example on a spring tongue, an actuating button 13 which, in order to form a locking connection with the wiper arm 1, engages in a corresponding recess on the upper side of the wiper arm 1, as is known from the prior art. Furthermore, two hose lines 4, 5 are arranged within the wiper arm 1, the hose lines serving to supply the wiper blade 10 with a washer fluid from a washer fluid container mounted on the vehicle.

The wiper blade 10 has a wiper blade body 15 which, as can be seen in particular from looking at FIGS. 2 and 3 together, comprises a wiper rubber 16.

On the side facing the vehicle windscreen, the wiper rubber 16 has a wiper lip 17 which bears against the vehicle windscreen. In the longitudinal direction of the wiper rubber 16, holding fixtures 18, 19 which are U-shaped in cross section are formed in the two longitudinal sides of the wiper rubber 16, in which part of the cross section of the spring strips 21, 22 engages in a positive locking manner. The spring strips 21, 22, which are conventionally pre-curved in the longitudinal direction, serve to stiffen the wiper blade 10 and the wiper rubber 16 transversely with respect to the longitudinal direction of the wiper rubber 16 and to produce a uniform bearing force on the wiper rubber 16 against the vehicle windscreen. Furthermore, an adapter element 24 which is on the wiper-blade side and is part of the wiper blade adapter 11 can be seen in FIGS. 2 and 3. The adapter element 24 on the wiper-blade side interacts with an adapter element on the wiper-arm side (not illustrated in the figures) which is arranged pivotably on the adapter element 24 on the wiper-blade side.

The adapter element 24 which is on the wiper-blade side and consists of plastic has, on sides facing one another, groove-like guides 25, 26 which are matched to the cross section of the spring strips 21, 22 and, in the manner of a rider, encompass, in a positive locking manner at least section-wise, those regions of the spring strips 21, 22 which project from the wiper rubber 16. The guides 25, 26 have a constant cross section in the longitudinal direction of the wiper blade. Washer fluid connections 27, 28 which project out of the two front edges of the adapter element 24 on the wiper-blade side can be seen above the guides 25, 26. A covering element 29 formed in the manner of a spoiler can be placed onto the two washer fluid connections 27, 28 on each front edge of the adapter element 24 on the wiper-blade side, FIG. 2 merely illustrating a single covering element 29 in order better to see the individual parts. In the covering element 29, washer fluid channels running over at least a large part of the length of the covering element 29 are formed on the two longitudinal sides of the wiper blade 10. Transverse bores emerge from the washer fluid channels and lead on the outer side of the covering element 29 into spray openings 30, of which only a single spray opening 30 is illustrated in FIG. 2.

The washer fluid connections 27, 28 are connected to the hose lines 4, 5 via corresponding feed elements in such a manner that the one hose line 4 is assigned to the one longitudinal side of the wiper blade 10 while the other hose line 5 is assigned to the other longitudinal side of the wiper blade 10.

According to the invention, the wiper blade adapter 11, in particular the adapter element 24 on the wiper-blade side, is provided with at least one reinforcing element 32 in the region of the guides 25, 26. In the exemplary embodiment illustrated, a separate reinforcing element 32 is provided in each case on each front edge of the adapter element 24 on the wiper-blade side, wherein, in the exemplary embodiment illustrated, the two reinforcing elements 32 are both formed identically.

The reinforcing element 32 is made of metal and is preferably in the form of a deep-drawn component. The material of the reinforcing element 32 is harder than the material of the adapter element 24, i.e., the reinforcing element 32 can absorb greater stresses than the adapter element 24 before it is plastically deformed. The reinforcing element 32 covers the respective front edge or front surface of the adapter element 24 on the wiper-blade side over the region of a basic body 33 of the adapter element 24 on the wiper-blade side, wherein the guides 25, 26 and the washer fluid connections 27, 28 are arranged in the basic body 33. The reinforcing element 32 has, starting from the front surface 34 thereof, an edge 35 which projects, at least section-wise, in the direction of the adapter element 24 on the wiper-blade side and encompasses a corresponding section of the adapter element 24 on the wiper-blade side in a positive locking manner such that the reinforcing element 32 is fixed immovably in the position thereof in the plane parallel to the front surface 34 of the adapter element 24 and forces are introduced and transmitted by the reinforcing element 32 to the adapter element 24 over a large surface area.

The respective reinforcing element 32 and the adapter element 24 are connected by a locking connection 40. The locking connection 40 is formed by two locks 41 which are arranged on opposite sides of the reinforcing element 32 and have hook sections 42 formed, for example, by a punching/stamping step. The hook sections 42 engage in depressions 38 formed in the adapter element 24. Furthermore, it can be seen that apertures 36, 37 for the feed-through of the washer fluid connections 27, 28 are formed in the region of the washer fluid connections 27, 28 on the front surface 34 of the reinforcing element 32.

As can be seen particularly clearly with reference to FIG. 4, the reinforcing element 32 has a cutout 43, which is open on one side, on the side facing the wiper lip 17 or the wiper rubber 16, the contour of which cutout is matched to the contour of the wiper rubber 16 and of the guides 25, 26. In particular, it is provided that the cutout 43 has two approximately rectangular clearances 44, 45 which are matched to the shape or to the cross section of the regions of the spring strips 21, 22 projecting from the wiper rubber 16 in such a manner that said regions bear directly in the clearances 44, 45.

A bearing contact is therefore formed between at least subregions of the sections of the spring strips 21, 22 projecting from the wiper rubber 16 and the clearances 44, 45. If transverse forces F (see FIG. 1) then occur, for example, because of wind forces which are not uniform over the length of the wiper blade 10, said transverse forces F are transmitted via the spring strips 21, 22 into the reinforcing element 32, which faces or is assigned to the respective transverse force F, wherein the transverse force is absorbed directly in the region of the clearance 44, 45 and is transmitted by the reinforcing element 32 via the positive lock in the region of the edge 35 to the adapter element 24 of the wiper-blade side.

The wiper blade 10 according to the invention described to this extent can be modified in diverse ways without deviating from the inventive concept. For example, it is conceivable, instead of a reinforcing element 32 which is arranged on a front edge of the adapter element 24 on the wiper-blade side, to fix, for example, reinforcing strips which are U-shaped in cross section and run over the entire length of the guides 25, 26, into the adapter element 24 on the wiper-blade side.

LIST OF DESIGNATIONS

1 Wiper arm
2 Wiper arm joint
3 Bearing element
4 Hose line
5 Hose line
10 Wiper blade
11 Wiper blade adapter
13 Actuating button
15 Wiper blade body
16 Wiper rubber
17 Wiper lip
18 Holding fixture
19 Holding fixture
21 Spring strip
22 Spring strip
24 Adapter element
25 Guide
26 Guide
27 Washer fluid connection
28 Washer fluid connection
29 Covering element
30 Spray opening
32 Reinforcing element
33 Basic body
34 Front surface
35 Edge
36 Aperture
37 Aperture
40 Locking connection
41 Lock
42 Hook section
43 Cutout
44 Clearance
45 Clearance
100 Wiper device
F Transverse force

The invention claimed is:

1. A wiper blade for cleaning vehicle windscreens comprising:
a wiper rubber with groove-like holding fixtures formed in the longitudinal sides of the wiper rubber, in which spring strips are partially contained,
wherein the spring strips project laterally from the holding fixtures with their longitudinal sides;
an adapter element consisting at least essentially of plastic for the at least indirect attachment of the wiper blade to a wiper arm, and comprising a plurality of front edges disposed on longitudinal ends of the adapter element, and
a plurality of covering elements placed on each front edge of the adapter element,
wherein the adapter element exhibits groove-like guides which are disposed on the two longitudinal sides of the adapter element on sides facing one another,
wherein the guides contact and encompass first sections of the spring strips that project from the holding fixtures,
wherein the adapter element is connected to at least one separate reinforcing element,
wherein the reinforcing element encompasses second sections of the spring strips that project from the holding fixtures,
wherein the first sections of the spring strips are separate from the second sections of the spring strips,
wherein the reinforcing element is directly attached to the spring strips and is disposed on and covers an external surface of the adapter element,
wherein the reinforcing element and the adapter element slidably attach to the spring strips in a longitudinal direction,
wherein the reinforcing element is monolithic and made of metal, and
wherein the reinforcing element exhibits additional openings for the feed-through of at least washer fluid connections, and wherein the washer fluid connections are inserted into the additional openings.

2. The wiper blade according to claim 1, wherein the reinforcing element is disposed in the area of a front end section of the adapter element.

3. The wiper blade according to claim 2, wherein the reinforcing element exhibits a circumferential edge section on the side facing the adapter element, the edge section encompassing the adapter element on a front edge thereof facing the adapter element in a positive locking manner and positioning the reinforcing element relative to the adapter element.

4. The wiper blade according to claim 2, wherein the reinforcing element is connected to the adapter element by a locking connection, the adapter element positioning the reinforcing element relative to the adapter element.

5. The wiper blade according to claim 1, wherein the reinforcing element is in the form of a deep-drawn part and covers the front edge of the adapter element.

6. The wiper blade according to claim 5, wherein the reinforcing element exhibits a circumferential edge section on the side facing the adapter element, the edge section encompassing the adapter element on a front edge thereof facing the adapter element in a positive locking manner and positioning the reinforcing element relative to the adapter element.

7. The wiper blade according to claim 5, wherein the reinforcing element is connected to the adapter element by a locking connection, the adapter element positioning the reinforcing element relative to the adapter element.

8. The wiper blade according to claim 1, wherein the reinforcing element exhibits a circumferential edge section on the side facing the adapter element, the edge section encompassing the adapter element on a front edge thereof facing the adapter element in a positive locking manner and positioning the reinforcing element relative to the adapter element.

9. The wiper blade according to claim 8, wherein the reinforcing element is connected to the adapter element by a locking connection, the adapter element positioning the reinforcing element relative to the adapter element.

10. The wiper blade according to claim 1, wherein the reinforcing element is connected to the adapter element by a locking connection, the adapter element positioning the reinforcing element relative to the adapter element.

11. The wiper blade according to claim 10, wherein the locking connection is formed by two locks on opposite sides on the reinforcing element, which engage in recesses in the adapter element.

12. The wiper blade according to claim 1 disposed in a wiper device.

13. The wiper blade according to claim 1, wherein the reinforcing element is in the form of a deep-drawn part and covers the front edge of the adapter element.

14. The wiper blade according to claim 1, wherein the reinforcing element exhibits a circumferential edge section on the side facing the adapter element, the edge section encompassing the adapter element on a front edge thereof facing the adapter element in a positive locking manner and positioning the reinforcing element relative to the adapter element.

15. The wiper blade according to claim 1, wherein the reinforcing element is connected to the adapter element by a locking connection, the adapter element positioning the reinforcing element relative to the adapter element.

16. The wiper blade according to claim 1, wherein washer fluid connections project out of the adapter element and are connected to hose lines via corresponding feed elements.

17. A wiper blade for cleaning vehicle windscreens, the wiper blade comprising:
   a wiper rubber with groove-like holding fixtures formed in the longitudinal sides of the wiper rubber, in which spring strips are partially contained,
   wherein the spring strips project laterally from the holding fixtures with their longitudinal sides; and
   an adapter element consisting at least essentially of plastic for the at least indirect attachment of the wiper blade to a wiper arm,
   wherein the adapter element exhibits groove-like guides which are disposed on the two longitudinal sides of the adapter element on sides facing one another,
   wherein the guides contact and encompass sections of the spring strips that project from the holding fixtures,
   wherein the adapter element is connected to at least one separate reinforcing element which encompasses the sections of the spring strips that project from the holding fixtures,
   wherein the reinforcing element is directly attached to the spring strips and wherein the reinforcing element and the adapter element slidably attach to the spring strips in a longitudinal direction,
   wherein the reinforcing element is disposed on and covers an external surface of the adapter element,
   wherein the reinforcing element is disposed in the area of a front end section of the adapter element,
   wherein the reinforcing element is made of metal,
   wherein the reinforcing element is in the form of a deep-drawn part and covers the front edge of the adapter element,
   wherein the reinforcing element exhibits a circumferential edge section on the side facing the adapter element,
   the edge section encompassing the adapter element on a front edge thereof facing the adapter element in a positive locking manner and positioning the reinforcing element relative to the adapter element,
   wherein the reinforcing element is connected to the adapter element by a locking connection, the adapter element positioning the reinforcing element relative to the adapter element,
   wherein the locking connection is formed by two locks on opposite sides on the reinforcing element, which engage in recesses in the adapter element,
   wherein the reinforcing element exhibits additional openings for the feed-through of at least washer fluid connections that project out of the adapter element, and
   wherein the washer fluid connections are connected to hose lines via corresponding feed elements.

18. The wiper blade according to claim 17 disposed in a wiper device.

19. The wiper blade according to claim 17, wherein the washer fluid connections are inserted into the additional openings.

20. A wiper blade for cleaning vehicle windscreens comprising:
   a wiper rubber with groove-like holding fixtures foamed in the longitudinal sides of the wiper rubber, in which spring strips are partially contained,
   wherein the spring strips project laterally from the holding fixtures with their longitudinal sides,
   an adapter element consisting at least essentially of plastic for the at least indirect attachment of the wiper blade to a wiper arm,
   wherein the adapter element has a central position in the wiper blade and is configured to interact with a second adapter element on a corresponding wiper-arm side which is arranged pivotably on the adapter element, and
   wherein the adapter element exhibits groove-like guides which are disposed on the two longitudinal sides of the adapter element on sides facing one another,
   wherein the guides contact and encompass first sections of the spring strips that project from the holding fixtures,
   wherein the adapter element is connected to at least one separate reinforcing element, wherein the reinforcing element encompasses second sections of the spring strips that project from the holding fixtures,
   wherein the first sections of the spring strips are separate from the second sections of the spring strips,
   wherein the reinforcing element is directly attached to the spring strips and is disposed on and covers an external surface of the adapter element, and
   wherein the reinforcing element and the adapter element slidably attach to the spring strips in a longitudinal direction.

21. A wiper blade for a vehicle, comprising:
   an adapter, made of plastic, that attaches to a wiper arm, comprising:
      an adapter cutout that spans a lateral length of the adapter,
      a plurality of groove-like guides on opposite internal longitudinal sides of the adapter cutout, and
      an external surface on a lateral side of the adapter;
   a reinforcement, that directly attaches to the adapter and at least partially covers the external surface, comprising:
      a reinforcement cutout spanning a lateral length of the reinforcement,
      a plurality of rectangular clearances disposed on opposite internal longitudinal sides of the reinforcement cutout, and
      wherein the reinforcement is made exclusively of metal;
   a plurality of spring strips that, respectively:
      span a lateral length of the of the wiper blade,
      traverse the adapter cutout,
      directly attach to the plurality of groove-like guides of the adapter,
      traverse the reinforcement cutout, and
      directly attach to the plurality of rectangular clearances of the reinforcement; and
   a wiper rubber that spans the lateral length of the wiper blade, comprising:
      a wiper lip, and
      a plurality of holding fixtures on opposite external longitudinal sides of the wiper rubber that are directly attached to the plurality of spring strips, respectively.

22. The wiper blade according to claim 21, wherein the reinforcement is manufactured via deep drawing.

23. The wiper blade according to claim 22, wherein the reinforcement further comprises a circumferential edge section and wherein the edge section encompasses the adapter on the external surface in a positive locking manner.

24. The wiper blade according to claim 22, wherein the reinforcement is connected to the adapter by a locking connection.

25. The wiper blade according to claim 21, wherein the reinforcement further comprises a circumferential edge section and wherein the edge section encompasses the adapter on the external surface in a positive locking manner.

26. The wiper blade according to claim 25, wherein the reinforcement is connected to the adapter by a locking connection.

27. The wiper blade according to claim 21, wherein the reinforcement further comprises a circumferential edge section and wherein the edge section encompasses the adapter on the external surface in a positive locking manner.

28. The wiper blade according to claim 21, wherein the reinforcement is connected to the adapter by a locking connection.

29. The wiper blade according to claim 28, wherein the locking connection is formed by a plurality of locks on opposite longitudinal sides on the reinforcement, which engage in a plurality of recesses on opposite longitudinal sides of the adapter.

30. The wiper blade according to claim 21, wherein the reinforcement is connected to the adapter by a locking connection.

31. The wiper blade according to claim 21, wherein the reinforcing further comprises a plurality of openings capable of, at least, allowing washer fluid connections.

32. The wiper blade according to claim 21 disposed in a wiper device.

* * * * *

UNITED STATES PATENT AND TRADEMARK OFFICE
CERTIFICATE OF CORRECTION

PATENT NO. : 10,093,279 B2
APPLICATION NO. : 13/952123
DATED : October 9, 2018
INVENTOR(S) : Wolfgang Scholl et al.

Page 1 of 1

It is certified that error appears in the above-identified patent and that said Letters Patent is hereby corrected as shown below:

In the Claims

At Column 8, Claim number 20, Line number 1, the word "foamed" should read -- formed --.

Signed and Sealed this
Fourth Day of December, 2018

Andrei Iancu
*Director of the United States Patent and Trademark Office*